United States Patent [19]
Lalikos et al.

[11] 4,259,989
[45] Apr. 7, 1981

[54] CHAFE OR FIRE SLEEVE FOR HOSE

[75] Inventors: James M. Lalikos, Springfield; Chester T. Gazda, Chicopee; Lawrence O'Melia, Easthampton, all of Mass.

[73] Assignee: Titeflex Corporation, Springfield, Mass.

[21] Appl. No.: 46,004

[22] Filed: Jun. 6, 1979

Related U.S. Application Data

[63] Continuation-in-part of Ser. No. 884,612, Mar. 8, 1978, Pat. No. 4,190,088.

[51] Int. Cl.³ .............................................. F16L 11/10
[52] U.S. Cl. ................................... 138/109; 138/126; 138/127; 138/125; 138/145; 138/178; 252/8.1; 428/36; 428/448; 428/447; 428/450; 428/113; 428/377; 428/425.5; 428/425.8; 428/423.1; 428/920; 428/921
[58] Field of Search ................. 428/36, 425, 447, 450, 428/448, 113, 377, 920, 921, 425.5, 425.8, 423.1; 138/125, 145, 126, 127, 178, 109; 285/149; 252/8.1

[56] References Cited
U.S. PATENT DOCUMENTS

| | | | |
|---|---|---|---|
| 2,577,049 | 12/1951 | Uline | 138/127 |
| 3,411,981 | 11/1978 | Thomas | 138/141 |
| 3,561,493 | 2/1951 | Maillard | 138/137 |
| 3,913,625 | 10/1975 | Gazda | 138/127 |
| 3,916,488 | 11/1975 | Gazda | 24/262 R |

FOREIGN PATENT DOCUMENTS 2124680 12/1971 Fed. Rep. of Germany ............ 428/36

OTHER PUBLICATIONS

"Hose Handbook", *RMA*, pp. 8-14.

Primary Examiner—Ellis P. Robinson

[57] ABSTRACT

A chafe or fire sleeve for a hose is an integral coaxial structure having an inner layer of silicone and an outer layer of urethane in the range of 80%–20% urethane and 20%–80% silicone, respectively. The inner hose structure preferably comprises an elastomeric hose covered by braid, with the silicone bonded onto the braid. Five examples of materials are given, ranging from pure urethane to pure silicone and including three exemplary mixtures thereof. Pure urethane provides excellent anti-chafe, but not fire retardant, qualities; and pure silicone provides excellent fire retardant, but not necessarily as good antichafe, qualities. This particular invention is primarily directed to the fire retardant or fire resisting qualities of silicone, which is an ablative material that forms a refractory ash. The fire sleeve is an ablative material which tends to flake off the hose as it burns. This flaking is a disintegration of the hose which is one of the primary causes of the ultimate hose failure. The invention provides a wire braid which encapsulates or contains the ablative material as it tends to flake, thereby holding the ablating material against the hose and retarding the disintegration of the hose.

11 Claims, 7 Drawing Figures

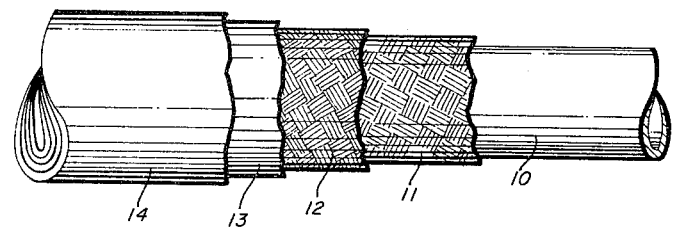
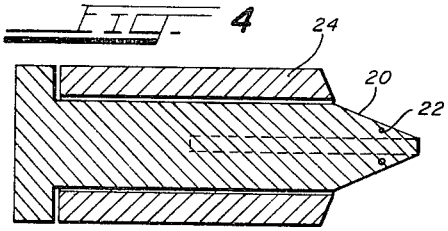
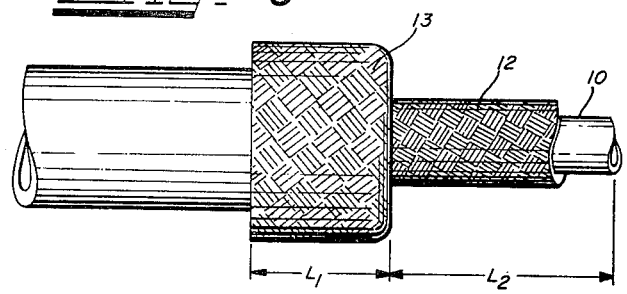
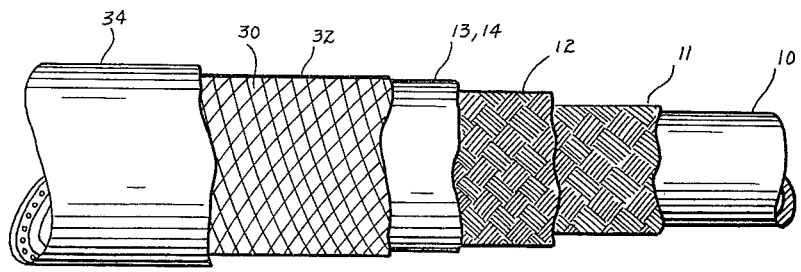
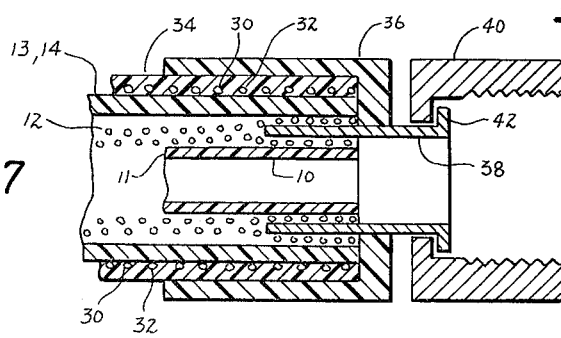

FIG. 2

COMPOSITION

| Material | Urethane<br>Silicone | 100%<br>0% | 70%<br>30% | 50%<br>50% | 35%<br>65% | 0%<br>100% |
|---|---|---|---|---|---|---|
| Urethane (Elastothane 640) | | 100 parts | 70 parts | 50 parts | 35 parts | |
| Silicone (GE SE 456) | | | 30 parts | 50 parts | 65 parts | 100 parts |
| Silica | | 10 parts | 7 parts | 5 parts | 3.5 parts | |
| Treated Clay | | 14 parts | 10 parts | 7 parts | 5 parts | |
| Silane | | 0.27 parts | 0.2 parts | 0.15 parts | 0.12 parts | |
| CoAgent | | | 1.5 parts | 1.5 parts | 1.5 parts | |
| Dessicant | | 3 parts | 3 parts | 3 parts | 3 parts | |
| Leveler | | 3 parts | 3 parts | 3 parts | 3 parts | |
| Plasticizer | | 2.5 parts | 2.5 parts | 2.5 parts | 2.5 parts | |
| Catalyst | | 2 parts | 1.85 parts | 1.8 parts | 1.77 parts | 1.8 parts |
| Pigment | | 4 parts | 4 parts | 4 parts | 4 parts | 4 parts |

Press Cure: 5 minutes at 350°F. for 100% to 50/50%
10 minutes at 325°F. for 35/65% to 0/100%.

No Post cure required.

FIG. 3

PHYSICAL PROPERTIES

| Test Condition | 100% Urethane ||| 70:30 Urethane:Silicone ||| 50:50 Urethane:Silicone ||| 35:65 Urethane:Silicone ||| 100% Silicone |||
|---|---|---|---|---|---|---|---|---|---|---|---|---|---|---|---|
| | U.T.S. | %E | Duro/wt.gain | U.T.S. | %E | Duro/wt.gain | U.T.S. | %E | Duro/wt.gain | U.T.S. | %E | Duro/wt.gain | U.T.S. | %E | Duro/wt.gain |
| Original Properties at Room Temp. | 1772 PSI | 167% | A75 | 1245 PSI | 155% | A70 | 1092 PSI | 177% | A68 | 1085 PSI | 210% | A68 | 1122 PSI | 600% | A57 |
| Aircraft Fuel Fluid Soak: | | | | | | | | | | | | | | | |
| 24 hr. JP-4 | 1681 PSI | 145% | A75/0.7% | 1192 PSI | 133% | A68/9.3% | 746 PSI | 108% | A61/26.1% | 684 PSI | 133% | A56/33.4% | 227 PSI | 120% | A37/99.4% |
| 24 hr. Mil-H-5606 | 1795 PSI | 150% | A74/0.6% | 1155 PSI | 140% | A69/5.7% | 872 PSI | 128% | A60/15.7% | 703 PSI | 132% | A60/20.3% | 274 PSI | 127% | A45/56.8% |
| 24 hr. Mil-F-7808 | 1745 PSI | 155% | A74/0.65% | 1286 PSI | 150% | A72/1.2% | 945 PSI | 142% | A67/3.6% | 992 PSI | 185% | A67/3.7% | 879 PSI | 550% | A54/7.4% |
| 24 hr. Skydrol 500A | 838 PSI | 103% | A70/14.9% | 840 PSI | 122% | A69/16.6% | 646 PSI | 127% | A65/16.9% | 800 PSI | 167% | A65/12.6% | 861 PSI | 537% | A51/5.1% |
| Heat Aged | | | | | | | | | | | | | | | |
| 168 hr. 250°F. | 1421 PSI | 127% | A78 | 1191 PSI | 135% | A73 | 1090 PSI | 153% | A70 | 1070 PSI | 175% | A70 | 920 PSI | 500% | A61 |
| 168 hr. 300°F. | 969 PSI | 57% | >A90 | 910 PSI | 118% | A76 | 829 PSI | 127% | A74 | 896 PSI | 150% | A75 | 1143 PSI | 562% | A64 |
| 168 hr. 350°F. | 1940 PSI | 0% | >A95 | 1257 PSI | 0% | >A95 | 807 PSI | 75% | A81 | 853 PSI | 122% | A81 | 1043 PSI | 517% | A63 |
| 168 hr. 400°F. | Deformed Specimen ||| Embrittled ||| 1253 PSI | 0% | >A95 | 762 PSI | 18% | >A95 | 976 PSI | 410% | A66 |

FLEX TEST

| | 100% Urethane ||| 70:30 Urethane:Silicone ||| 50:50 Urethane:Silicone ||| 35:65 Urethane:Silicone ||| 100% Silicone |||
|---|---|---|---|---|---|---|---|---|---|---|---|---|---|---|---|
| Condition Temp. | 10 T | 3 T | 1 T | 10 T | 3 T | 1 T | 10 T | 3 T | 1 T | 10 T | 3 T | 1 T | 10 T | 3 T | 1 T |
| Room Temp. | Pass | Pass | Pass | Pass | Pass | Pass | Pass | Pass | Pass | Pass | Pass | Pass | Pass | Pass | Pass |
| 4 hr. -65°F. | 2 Pass / 1 Fail | Fail | Fail | Pass | Pass | Fail | Pass | Pass | Fail | Pass | Pass | Pass | Pass | Pass | Pass |
| 168 hr. 250°F. | Pass | Pass | Pass | Pass | Pass | Pass | Pass | Pass | Pass | Pass | Pass | Pass | Pass | Pass | Pass |
| 168 hr. 300°F. | Pass | Pass | Pass | Pass | Pass | Pass | Pass | Pass | Pass | Pass | Pass | Pass | Pass | Pass | Pass |
| 168 hr. 350°F. | Pass | Pass | Fail | Pass | Pass | Fail | Pass | Pass | Fail | Pass | Pass | Pass | Pass | Pass | Pass |
| 168 hr. 400°F. | Not Suitable for Testing ||| Fail | Fail | Fail | Fail | Fail | Fail | Pass | Pass | Pass | Pass | Pass | Pass |
| Abrasion | Not Determined ||| 8.17% wt. loss ||| Not Determined ||| Not Determined ||| Not Determined |||

CHAFE OR FIRE SLEEVE FOR HOSE

This is a continuation-in-part of a copending application entitled "CHAFE OR FIRE SLEEVE FOR HOSE", Ser. No. 884,612, filed Mar. 8, 1978, by James M. Lalikos, Chester T. Gazda, and Lawrence O'Melia, and assigned to the assigneee of this invention now U.S. Pat. No. 4,190,088, issued Feb. 26, 1980.

This invention relates to new and improved composite hoses with chafe or fire sleeves, and more particularly to hoses which are especially—although not exclusively—well adapted for use as a fuel line hose on a high performance aircraft, for example. A braid or cage, preferably of stainless steel wire, surrounds, encapsulates, and contains the fire sleeve to prevent a loss of ablated material and thereby retard a disintegration thereof.

In the environment in which the inventive hose is used, its outer covering must do two things. First, it should resist chafing when mechanical abrasion occurs, and second it must not deteriorate in the presence of fire to such an extent that it allows raw fuel within the hose to be fed to the flames. Therefore, it is equally plausible to refer to the outer covering as a "chafe sleeve", a "fire sleeve", or a "chafe or fire sleeve". For convenience, the specification will hereinafter use the expression "chafe sleeve" in a generic manner to cover both of these characteristics.

For hoses to be suitable for fuel line use on an aircraft, they must reliably retain their desirable characteristics over a wide range of hostile environmental conditions. For example, when one end of an aircraft fuel line hose is near a hot engine, it may encounter temperatures in the order of 400° F., or more. When the aircraft is flying at extremely high altitudes, the other parts of the same fuel line hose might encounter ambient temperatures such as −65° F. The hose may contain oil or hydrocarbon fuel, being pumped under extremely high pressure. Of course, there is no way of knowing whether any other chemical might be spilled, come into contact with, or otherwise be deposited on the hose.

The movement and vibration of the aircraft during flight may cause the exterior of the hose to chafe against nearby aircraft body structural elements. If there should be a fire, the hose might be damaged or might deteriorate; nevertheless, it also would be expected to safely contain the fuel under pressure and to withstand extremely high temperatures without spilling the oil or fuel into the fire despite such damage. Thus, it is desirable to provide a fire and chafe sleeve which is expected to provide a fire retardant barrier to protect the inner structure of the hose.

About 1963, pressure was applied to eliminate asbestos, and it became apparent that eventually all products with free asbestos would be outlawed. Prior to that time, asbestos was often used as the fire sleeve on hoses. The impending outlawing and disuse of asbestos led to an investigation of ways and means for eliminating asbestos as a fire retardant on the hoses. The fire retardant capability of silicone, and the fact that its chemical does not deteriorate either before or after being exposed to heat, makes it attractive for use as a fire sleeve on a hose. Also, the resultant sleeve is reasonably compatible with fluids normally used in the aerospace industry.

Other chafe resistant materials which have these characteristics and which are able to provide these functions are found among the modern and more recent elastomerics. Among these modern elastomers are "Teflon", urethane, silicone, and combinations thereof. Regardless of which of these or other materials are used, it is desirable that they be extrudable. However, a use of these materials and of the techniques required to manufacture hoses from them presents a number of problems which are difficult to solve.

Most of the plastic materials presently used for chafe sleeves, such as PTFE, cause the hose to become stiff and thus restrict their bend radius. The techniques for extruding tubes made from silicone and the like required hose wall thicknesses up to ¼ inch. If the elastomeric jackets allow full flexibility, they tend to inhibit a widespread use of the hose because they impose narrow temperature limits or limited compatibility with different kinds of fluids.

If a urethane material is used as a chafe sleeve, it gives a good abrasion resistance, but it is considered unsuitable for temperatures above 250° F. and below −40° F. Silicone has poor abrasion resistance and is not practical for service with hydrocarbon fuel and oil.

The "fifteen minute" fire test has become a standard material reqirement. The primary difficulty stemmed from vibration, which introduced a resonant wave form that broke up the embrittled burning sleeve and resulted in assembly failures at less than fifteen minutes.

Until recently, there was no good reason to add anything to the integral sleeve because the tubular asbestos sleeve continued to be acceptable to industry and it was economical. More recently, however, the industry has been forced to turn away from asbestos. Often, the molded silicone was not cost effective, especially for long lengths, such as hoses often used in hydraulic systems. Therefore, an ⅛ inch thick silicone sleeve is required, as a practical economic matter, but it must still pass the fifteen minute fire test. Tests have demonstrated that an unsupported extruded sleeve of this thin wall is very marginal, for a fifteen minute test.

To overcome these and other problems, the fire protection may be obtained by ablation. In the presence of fire, the silicone or similar material forms a high insulating refractory at the surface, which gradually wears off in the form of dust and small particles flake away as it burns, especially under severe vibration. Protection is also given by expansion/aeration which takes place between the silicone or similar material expands substantially when subjected to very high temperature. As it expands, it becomes refractory, very porous and brittle. Under severe vibration, the refractory breaks off in relatively large pieces. Regardless of why the pieces break away, the underlying silicone starts to expand, leading to premature hose damage.

Accordingly, an object of this invention is to provide a composition and a sleeve structure for protecting hoses, especially those hoses which might be suitable for use on an aircraft. Still a further object of the invention is to retard the disintegration of a fire sleeve responsive to an ablation thereof. Here, an object is to encapsulate an ablative material on a hose.

Another object of the invention is to provide hoses which continue to give good and unimpaired service over at least the entire temperature range of −65° F. to 400° F.

Still another object of the invention is to provide chafe or fire sleeves which are abrasion resistant, can be used with oil, hydrochemical fuel, and other chemicals, and do not spill fluids during fires which are less than a total disaster. Here, an object is to make chafe sleeves from high temperature plastic materials which exhibit ablation properties and become stronger in the presence of fire, and which tend to be refractive and to self-extinguish when burned.

Yet another object is to provide ablation resistant sleeves for hoses, which sleeves remain flexible and do not make the hose become stiff and rigid. Here, an object is to provide hoses which may be fished through internal aircraft structural members.

In keeping with an aspect of the invention, the above stated and other objects are accomplished by encapsulating the sleeve by a material which holds ablating particles in place even if they break away from the sleeve material. In one embodiment, the encapsulation is a basket weave, braid, or cage of stainless steel wire. Thus, the ablative particles continue to provide an insulating quality for the hose and, therefore, to prolong the life of the hose. To further protect the hose, the encapsulation material is covered by a sleeve of plastic material.

Various forms of the invention may be understood from the attached drawings wherein:

FIG. 1 is a perspective view of the chafe sleeve used on an exemplary hose, here shown as one having an elastic inner tube member covered by two layers of braid;

FIG. 2 is a table which gives a series of representative compositions of the material;

FIG. 3 is a table which gives the variation in physical properties of the material;

FIG. 4 is a cross-sectional view of a tool used to apply end fittings to the hose;

FIG. 5 is a side elevation view of one embodiment of the hose to which a fitting may be attached;

FIG. 6 shows a hose which has an ablative layer that is encapsulated, as taught by the invention; and FIG. 7 shows an elastomer cuff which seals a fitting to the end of the inventive tube.

The inventive chafe or fire sleeve is shown on an exemplary hose (FIG. 1) which may include an internal elastic tube made of a flexible, elastomeric material 10, a reinforcing braid 11, an electrically conductive braid 12, and an outer chafe sleeve 13, 14. Of course, the total hose structure may vary significantly, depending upon the anticipated uses of the hose. For example, if electrical grounding is not important, the electrically conductive braid 12 may be omitted. Or, if mechanical reinforcing strength is not required, the braid 11 may be omitted. If either or both of these braided layers are omitted, the chafe sleeve 13, 14 is applied directly over the remaining elastomeric hose 10.

The outer layer 14 of the chafe sleeve is made from a mixture of urethane and silicone, and suitable additives which may be cured to form a copolymer. The inner layer 13 of the chafe sleeve is preferably made from pure silicone. FIG. 2 sets forth the composition of five different working examples of materials which may be used to make the chafe or fire sleeve. Neglecting the additives: the first example includes 100% urethane; the second example includes 70% urethane and 30% silicone; the third example includes 50% urethane and 50% silicone; the fourth example includes 35% urethane and 65% silicone; and the fifth example is 100% silicone. Either or both sleeves 13, 14 may be used on the hose. The chafe sleeve is bonded directly onto the wire braid when it is used; or, a fire sleeve may be extruded around the hose when it is used.

The selection of one of these exemplary materials depends upon the user's particular needs. The parent application Ser. No. 884,612 (now U.S. Pat. No. 4,190,088) focuses upon the mixture of 80%/20% to 20%/80% of urethane and silicone, which mixture gives varying degrees of chafe and fire protection. This invention focuses primarily upon the mixtures and materials spectrum which provide fire protection. In general, this is the end of the exemplary scale with a higher concentration of silicone.

When pure silicone is used under fire conditions, there is a very strong refractory ash which hangs together much better than does even the 20% urethane and 80% silicone mixture. Thus, pure silicone is the best selection of material to use for a purely fire sleeve, with the encapsulating wire braid. As the chafe qualities become more important and the fire resistant qualities become less important, the selection moves from pure silicone to mixtures which have a progressively less proportion of silicone. When the selection reaches pure urethane, there is little or no fire protection because it burns and melts, but it has excellent chafe protection. Obviously, the encapsulating braid does not serve a substantial purpose after the concentration of silicone falls below approximately 20%.

FIG. 2 makes reference to urethane-elastothane 640 and to silicone General Electric SE 456. Urethane-elastothane 640 is a millable vulcanizable polyester gum urethane, produced by the Thiokol Company, and has the following properties.

| Chemical type | Polyester urethane |
|---|---|
| Physical form | Solid |
| Color | Light amber |
| Specific gravity | 1.15 |
| Mooney viscosity | 25-50 |
| [ML 1 + 3 212° F. (100° C.)] | |

| PROPERTY | SULFUR CURE | PEROXIDE CURE |
|---|---|---|
| Tensile strength, psi (Kg/cm$^2$) | 5530 (390) | 4880 (343) |
| Elongation, % | 490 | 320 |
| 200% modulus, psi (Kg/cm$^2$) | 1630 (115) | 2200 (155) |
| Hardness, Shore A | 77 | 72 |
| Tear (Die C) pli (Kg/cm) | 340 (60.7) | 250 (44.6) |
| Compression set, % 22 hrs. at 158° F. (70° C.) | | |
| Low temperature, torsional °F. (°C.) (ASTM D-1043) | −6 (−23) | −14 (−29) |

Silicone General Electric SE 456 is a methyl-vinyl-silicone elastomer which is capable of compounding with other materials. The manufacturer states that this material has the following properties:

| CURING AGENT | SE-456U | |
|---|---|---|
| Bis(2,4 DiChlorobensoyl) Peroxide 50% Active | 1.2 | |
| 2,5 DiMethyl-2,5 Di (t-Butyl Peroxy) Hexane 50% Active | | 1.0 |
| Press Cure Conditions | 10 Min at 250° F. | 10 Min at 350° F. |
| Post Cure Conditions | 4 hrs at 400° F. | 4 hrs at 400° F. |
| TYPICAL PROPERTIES | | |
| Durometer, Shore "A" | 50 ± 5 | 50 ± 5 |
| Tensile Strength (psi) | 1300 | 1300 |
| Elongation (%) | 550 | 700 |
| Tear Resistance (#/in) | 200 | 200 |
| Compression Set (%) | | |
| 70 hrs. at 212° F. | 16 | 17 |
| 70 hrs. at 300° F. | 30 | 31 |

-continued

| | | |
|---|---|---|
| 22 hrs. at 350° F. | 30 | 32 |
| Tensile Stress Modulus | | |
| at 100% Elongation (psi) | 215 | 220 |
| at 200% Elongation (psi) | 485 | 375 |
| at 400% Elongation (psi) | 855 | 735 |
| Bashore Resiliency | 50 | 50 |
| Brittle Point °F. | −130 | −130 |
| % Linear Shrinkage | 3.0 | 4.0 |
| Tear Propagation Resistance Flex Cycles at 75° F. | >150,000 | >150,000 |

The aforesaid specific urethane and silicone material compositions are indicative of the general type of urethane and silicone materials usable in the inventive compositions.

FIG. 3 sets forth, in detail, the test results for each of the aforementioned five examples. These test results are apparent from a study of the figure. Therefore, it is thought that those who are skilled in the art may identify the particular materials which best meet their individual needs by a comparison and contrast of the various figures. Moreover, after a study of these figures, it is obvious from the data that the properties of the material are improved significantly within the composition mixture range of 80% to 20% urethane and 20% to 80% silicone.

Other benefits which are not immediately apparent in the chart of FIG. 3 are that the fire resistance and self-extinguishing properties of urethane are enhanced even when concentrations of urethane are as high as 80%. If there is 100% urethane, it burns and melts as a thermoplastic when subjected to a torch. The composite mixture of urethane and silicone does not melt when there is at least 20% silicone. Rather, it forms a refractory type ash which resists further deterioration in fire. As higher levels of silicone are added, the refractory structure becomes stronger and the self-extinguishing characteristics are enhanced.

Flame retardants can be introduced as fillers to further enhance the self-extinguishing characteristic of the material. However, these fillers tend to cause the chafe sleeve material to lose its flexibility at very cold temperatures. At temperatures of −65° F. and lower, the fillers can cause the material to split when it is flexed, as when the hose bends around a minimum radius set forth in standard hose specifications.

In order to provide a maximum chafe resistance, the chafe sleeve material should be bonded directly to the hose body. Urethane alone gives a poor bond, especially if the metallic braid 12 is used on the hose. However, silicone does bond well to the braid, and the urethane/silicone composition bonds well to the silicone.

The bonding is best when the chafe sleeve is made from a pair of coaxial layers 13, 14. Pure silicone is used in the inside layer 13 and is bonded directly to the metal braid 12. Preferably, this inner layer 13 is colored red, or another convenient color. The outside layer, chafe resistant sleeve 14 is black or another contrasting colored layer, and is made of a urethane/silicone copolymer mixture which is bonded onto the inside red silicone layer 13. If the red layer 13 is exposed to view, it serves as a signal that chafing has occurred (i.e., when the chafe sleeve layer 14 has worn through, the red color of the under layer 13 shows through and contrasts with the outer layer 14).

FIG. 6 shows the inventive encapsulation of the fire hose. In greater detail, in the presence of fire the surface of the layer 13, 14 tends to ablatively flake away. To preclude a loss of refractory material despite the ablative flaking, a basket weave braid or cage of stainless steel wire 30, 32 is woven around the layer 13, 14. The wires 30, 32 in this basket weave are separated by a distance which is great enough to expose the fire sleeve 13, 14 to the fire so that the self-extinguishing, refractive ash qualities of the plastic may be exploited. However, the wires 30, 32 are also located closely enough to contain most, if not substantially all, of the particles which might otherwise tend to flake away. Thus, as the fire sleeve tends to burn, it exhibits ablative properties, becomes stronger, and tends to become a refractive ash. The retardation of the hose disintegration by ablation causes it to withstand a fire for a longer period of time before it is ultimately destroyed.

Finally, to prevent the wires 30, 32 from being mechanically displaced during normal usage, the entire basket weave may be covered with another layer 34 of chafe or fire sleeve material similar to the material used to make the sleeve 13, 14. Thus, if it is never exposed to fire, the encapsulating basket weave is completely buried within the plastic walls formed by the contiguous layers 13, 14, 34.

In other embodiments, the stainless steel wire 30, 32 has been successfully replaced by various refractory fibers.

FIG. 4 shows a tool which may be used to attach a fitting to the hose. The tool includes a central mandrel or tube 20, having a tapered and conical end with air holes 22 formed around the periphery thereof. A sliding sleeve is positioned to slide back and forth on the tool 20.

In order to make a completed hose, the jacketed hose of one embodiment is first cut to a desired length. Then, one end of the inner tube 10 is fitted over the tapered point of the tool 20. Air is expelled through the air holes 22 to form a thin friction-free air bearing surface between the hose and the tool. The hose is then pushed onto the tool 20 until it engages the sliding sleeve 24. Next, the sleeve 24 is moved toward the tool which forces the jacket 13 to double-back upon itself. Eventually, the sleeve 24 doubles back a predetermined and desired amount of the braid leaving a short section of braided hose exposed.

The tool 20 is removed from the hose leaving it as shown in FIG. 5. The braid layer 13 has been separated from the layer 12 and doubled back for a distance L1, leaving a nondoubled back length L2 of reduced diameter onto which a fitting may be slipped and bonded. As seen in FIG. 5, the two braided layers 12, 13 have a mutually reversed braid pattern, which provides a greater number of bondable interstices. Without this added number of interstices, a bonding material might be extruded when the braid is returned to its original configuration.

The fitting is next slipped onto the braid 12 with a suitable bonding material therebetween. Then the doubled back portion L1 is rolled back into its original position, and over the fitting, with a suitable bonding material therebetween. Hence, the fitting is bonded onto the end of the hose. Also, the metallic braid 13 may be cemented in place with a conductive bond on the fitting.

In reference to the embodiment which may be folded back, as seen in FIG. 5, the foregoing description has referred to a combined chafe sleeve with an extruded fire sleeve. These are not necessarily used on the same products. The chafe sleeve must be bonded to the wire braid if it is to be fully effective. When it is properly bonded, it cannot be folded back as shown in FIG. 5. The fold-back technique is primarily used for fire sleeves.

In some embodiments, a cuff 36 (FIG. 7) is molded on over the end of the tube to seal together the various layers and to join the tube to the fitting. More particularly, in FIG. 7 the fitting is shown as a simple metal tube 38 having a threaded nut 40 fitted over its end. Then the tube 38 is flared at 42 to capture the nut while enabling it to rotate freely. Any suitable gaskets or washers (not shown) may be placed in the interior bottom of the nut 40 to provide a suitable seal between the various fittings. Also, the tube 38 may have any suitable annular grooves or ridges (not shown) which enable the fitting to be better sealed to the hose. After the cuff is molded in place, the entire end of the hose structure and the metal tube 38 are sealed together to form a completely integrated end.

In some embodiments, the cuff 36 may have a color contrasting to the color of the encapsulation basket weave covering layer 34 so that end scuffing will become visibly apparent. In this case, the cuff 36 may be molded over the entire outer surface of the layer 34, thereby formimg a continuous seal extending over both ends and the entire length of the hose.

The advantages of the invention should now be apparent. In addition to being a good chafe guard, with a wide range of service temperature and a wide range of chemical compatibility, this composite material also provides good fire protection. Its fire insulating quality is obtained from the refractory ash that forms when the chafe sleeve on the hose is subjected to a sufficiently high temperature. The ash is held in place by the encapsulating braid 30, 32, so that it continues to provide good fire protection even after it has changed its state from a plastic to a ceramic-like charred ash.

Those who are skilled in the art will readily perceive how the inventive material may be used or modified. Therefore, the appended claims should be construed broadly to cover all equivalent materials and structures which fall within the true scope and spirit of the invention.

We claim:

1. A chafe or fire sleeve for an aircraft fuel hose comprising an internal tube with an outer sleeve integrally formed thereon, said sleeve having a pair of coaxial layers, an outer of said coaxial layers being the chafe or fire sleeve made from a mixture of urethane and silicone elastomers, said urethane and slicone in said outer layer being mixed, with their proportions being in the range of 80% to 20% urethane and 20% to 80% silicone, respectively, an inner of said coaxial layers being silicone, and nonburning encapsulating material having interstices for exposing said outer layer to fire, whereby said outer material ablates, said encapsulating material covering and surrounding said outer layer to capture and hold any outer layer material flakes or particles which ablate in the fire.

2. The chafe or fire sleeve of claim 1 wherein said encapsulating material comprises a basket weave of fire resistant fiber material surrounding said outer coaxial layer.

3. The chafe or fire sleeve of claim 2 wherein said fire resistant material is a metal wire.

4. The chafe or fire sleeve of claim 3 wherein said wire is stainless steel.

5. The chafe or fire sleeve of claim 2 wherein said fire resistant material is a refractory fiber.

6. The chafe or fire sleeve of claim 1 and at least some pure silicone interposed between and bonding together said outer coaxial layer and said encapsulating material.

7. The chafe or fire sleeve of claim 2 and a covering of elastomeric material over said basket weave of fire resistant fiber.

8. The chafe or fire sleeve of claim 7 and a layer of reinforcing braid, fitting means attached to said hose and having a tubular end part interposed between said braid and said outer layer, and cuff means covering the ends of both said hose and said fitting for sealing together said layers and said fitting as an integral unit.

9. The chafe or fire sleeve of claim 2 wherein there are two layers of reinforcing braid on said hose, and means for attaching a fitting thereto by folding back an outer layer of said braid, means for bonding a fitting to the inner layer of said braid, and said folded back layer of braid being brought back over said fitting with a bonding agent therebetween.

10. The chafe or fire sleeve of claim 9 wherein said fire resistant fiber material is covered by a layer comprising a mixture of urethane and silicone, and cuff means bonded over at least the end of said last named layer and continuing to a bonding of the fitting, thereby sealing together the end of said hose to said fitting into an integral unit.

11. The hose of claim 1 wherein said encapsulating means has open areas to expose the surface of the outer layer of said tubing to heat, said open areas being small enough to contain said ablating particles.

* * * * *